United States Patent [19]
Nakao et al.

[11] Patent Number: 5,939,804
[45] Date of Patent: Aug. 17, 1999

[54] LINEAR ACTUATOR AND OPTICAL EQUIPMENT USING THE SAME

[75] Inventors: Suguru Nakao, Itami; Tomokazu Tokunaga, Taki-gun; Yosuke Yamane; Norihiko Saka, both of Neyagawa, all of Japan

[73] Assignee: Matsushita Electric Industrial Co., Ltd., Osaka, Japan

[21] Appl. No.: 09/020,676

[22] Filed: Feb. 9, 1998

[30] Foreign Application Priority Data

Feb. 10, 1997 [JP] Japan ................................ 9-026476
Nov. 13, 1997 [JP] Japan ................................ 9-311765

[51] Int. Cl.⁶ ...................................... H02K 41/00
[52] U.S. Cl. .............................................. 310/12
[58] Field of Search .................... 310/12, 13, 14, 310/15, 23; 318/135; 335/281

[56] References Cited

U.S. PATENT DOCUMENTS

| | | |
|---|---|---|
| 4,697,113 | 9/1987 | Young .................................. 310/15 |
| 5,229,669 | 7/1993 | Takei .................................... 310/12 |
| 5,536,983 | 7/1996 | Araki et al. ........................... 310/12 |

FOREIGN PATENT DOCUMENTS

| | | |
|---|---|---|
| 5-62379 | 12/1993 | Japan . |
| 5-62380 | 12/1993 | Japan . |
| 5-62383 | 12/1993 | Japan . |

*Primary Examiner*—Thomas M. Dougherty
*Assistant Examiner*—Judson H. Jones
*Attorney, Agent, or Firm*—McDermott, Will & Emery

[57] ABSTRACT

A linear actuator in a simple structure with an excellent S/N characteristic has a movable coil incorporating a pair of magnetic circuits 8a and 8b. The magnetic circuit 8a comprises yokes 6a and 7a, and a magnet 5a of which polarization direction is vertical with regard to a driving direction. The magnetic circuit 8b has the same structure as 8a. As a position detector, a magnetic sensor 10 and a magnetic scale 11 are disposed opposite with each other on a stator side and on a movable element side respetively.

8 Claims, 13 Drawing Sheets

LINEAR ACTUATOR AND OPTICAL EQUIPMENT USING THE SAME

FIELD OF THE INVENTION

The present invention relates to a linear actuator, which is utilized for driving a group of traveling lenses mounted to optical equipment such as a still camera, video camera, etc. A linear actuator, of which the principle of operation is that a magnetic circuit comprising a magnet and a yoke drives a coil linearly, is widely used in various fields such as industrial equipment including robots, printing devices including a printer and a plotter, recordingplaying back devices including a hard disc device and an optical magnetic disc device, and optical equipment including a still camera, a video camera, etc.

BACKGROUND OF THE INVENTION

In a camera mechanism, when moving a group of traveling lenses for adjusting focus at a predetermined point in order to form an image of an object on an image formation surface of an image sensor or the like, or when having a read/write head of a hard disc device reach a specified track of the disc, a position detector for detecting a position of a movable part is provided in order to accurately position the movable part such as the group of traveling lenses, or a read/write head.

The position detector is grouped into two groups; one is an optical position detector, which is combined with an optical sensor comprising a luminescent element such as an LED (light emitting diode) and a light-intercepting element such as a photo transistor, with an optical scale formed by a transparent part and a shading part interleaved with each other in a fine pitch, and the other one is a magnetic position detector, which is combined with a magnetic sensor such as a magnetoresistive element (MR element) or a Hall element, etc. with a magnetic scale made from a magnetic body polarized in a fine pitch.

In the optical position detector employing a conventional design, an output quantity of light varies responsive to a temperature. Therefore, an adjustment circuit accommodating the detector to a temperature change, or a control system admitting a temperature difference is necessary to be incorporated. In addition, a relative mechanical position between the luminescent element, optical scale, and light intercepting element must be accurately adjusted so that light radiated from the luminescent element may arrive at the light intercepting element through fine patterns of the trasparent part on the light scale. An adjustment mechanism is thus required. As a result, the optical position detector employing a conventional design becomes large in size and expensive in cost.

Regarding the magnetic position detector employing a conventional design, in contrast to the optical sensor, the magnetic sensor such as a Hall element has a better temperature characteristic than that of the optical sensor, therefore, the adjustment circuit for accommodating the detector for a temperature change is not require The relative positioning adjustment is not as complicated as that for the optical sensor, because only a clearance between the magnetic sensor and magnetic scale has to be adjusted so that a strength pattern of magnetic field formed in a sign-wave and polarized by the magnetic scale can be detected by the magnetic sensor. Thus a simple adjustment mechanism can satisfy the requirement. This proves that the magnetic position detector has an advantage of reducing a sensor in size as well as in cost. The magnetic position detector has been thus employed extensively in the linear actuator which controls a positioning of a group of traveling lenses for a focus adjustment of optical equipment such as a camera.

However, in the linear actuator employing the conventional magnetic position detector, the S/N (ratio of signal to noise) of the magnetic sensor lowers due to leakage flux from the driving magnetic circuit because the magnetic sensor is placed near to the driving magnetic circuit. Providing both the driving magnetic circuit and the magnetic sensor with magnetic shields may be a countermeasure against this problem. It is hard to shield the leakage flux entirely, and yet, the shields contribute to a complicated structure.

In order to reduce this harmful influence to the magnetic sensor due to the leakage flux, a device regarding a disc drive device was disclosed in Japanese Patent Office (Laid open No. is H05-62383.) The structure of this disc drive device is as follows. A pair of magnets and a pair of coils are symmetrically disposed respectively as moving means of a head carriage, and a pair of linear motors of which polarity are reciprocal to those of the magnets symmetrically disposed are employed. A magnetic sensor is mounted to the head carriage, which is on a movable element side, and a magnetic scale is mounted to a member of a stator side disposed on a locus of the magnetic sensor. In addition, another magnetic sensor is disposed at the center between a pair of linear motors symmetrically disposed Another structure contrary to the above one can be available, namely, the magnetic scale is disposed on the head carriage of the movable element side, and the magnetic sensor is disposed on the member of the stator side.

According to the above disc drive device, the leakage fluxes produced from the linear motors symmetrically disposed are cancelled with each other at least in one dimension of the three dimensions because the polarity of each magnet which is mounted to each of the linear motors is reversed at the center of the two linear motors. As a result, the leakage fluxes influence the magnetic sensor less, and the influences of the leakage fluxes toward a sensors driven direction (X direction) and a vertical direction (Z direction) are cancelled with each other.

Even in the above structure, the following problems still remain: (1) Since the polarities of the two magnets are reciprocal with each other, a direction of electric current running through the coil must be directed opposite to the counterpart of another coil by the pair of linear motors symmetrically disposed. Two coils are thus essential in the above structure, which increases a power consumption as well as a size of the linear actuator, and also contributes to an more expensive linear actuator. Magnetic fluxes produced by the currents running through the two coils are not cancelled at the position of the magnetic sensor but are doubled and affect the magnetic sensor. Further, with regard to a horizontal direction (Y direction), because the leakage fluxes are not cancelled, a rate of change of the magnetic resistance of the Hall element is changed, thereby lowering sensitivity of the sensor.

SUMMARY OF THE INVENTION

The present invention aims to provide a linear actuator which does not affect a magnetic sensor so much with leakage flux produced by a driving magnetic circuit and has an excellent S/N characteristic, and an optical equipment using the same linear actuator.

The linear actuator of the present invention comprises the following elements: (a) a stator comprising at least one magnetic circuit which has a magnet polarized vertically with regard to both a yoke and a driving direction, (b) a movable element comprising one coil which moves along the driving direction through tuning on the electricity where a current runs at a right angle to a magnetic flux produced by the magnet, the movable element having a predetermined clearance between the magnet, and (c) a position detector comprising a magnetic scale disposed on either one of the stator or the movable element, and a magnetic sensor disposed on either the stator or the movable element whichever remains vacant. Since the linear actuator of the present invention comprises one movable coil, leakage flux from the coil does not affect greatly the magnetic sensor.

When the linear actuator of the present invention is actually used, it operates the following preferred mode. A first and a second magnetic circuits are provided so that the magnet polarizing directions of the two circuits are opposite to each other, thereby leakage fluxes along the magnet polarizing directions cancels with each other at the symmetric center. As a result, the flow of leakage flux, at a right angle to the driving direction, into the magnetic sensor becomes weaker. An MR element is employed as the magnetic sensor, and the MR sensor is disposed so that electric current running through the MR element may be approximately parallel to the magnet polarizing direction of the first and the second magnetic circuits, whereby sensitivity of the magnetic sensor is prevented from being lowered due to magnetic disturbance. A magnetic body is disposed on each magnet side of the first and the second magnetic circuits, which results in drawing the leakage flux to the magnetic body, and thereby decreasing magnetic fluxes of which directions are both vertical with regard to the driving direction at the position of the magnetic sensor. In addition, when the magnetic body is incorporated into the yoke, an entire structure becomes less complicated.

Another preferred mode of the linear actuator of the present invention is as follows: One magnetic circuit is employed to the stator, this magnetic circuit has an approximately symmetric shape viewed from the driving direction. This structure also can decrease the leakage flux flowing to the magnetic sensor at a right angle to the driving direction. The MR element is preferably used also in this mode.

DETAILED DESCRIPTION OF THE PREFERRED EMBODIMENT

Embodiment 1

Figure 1:
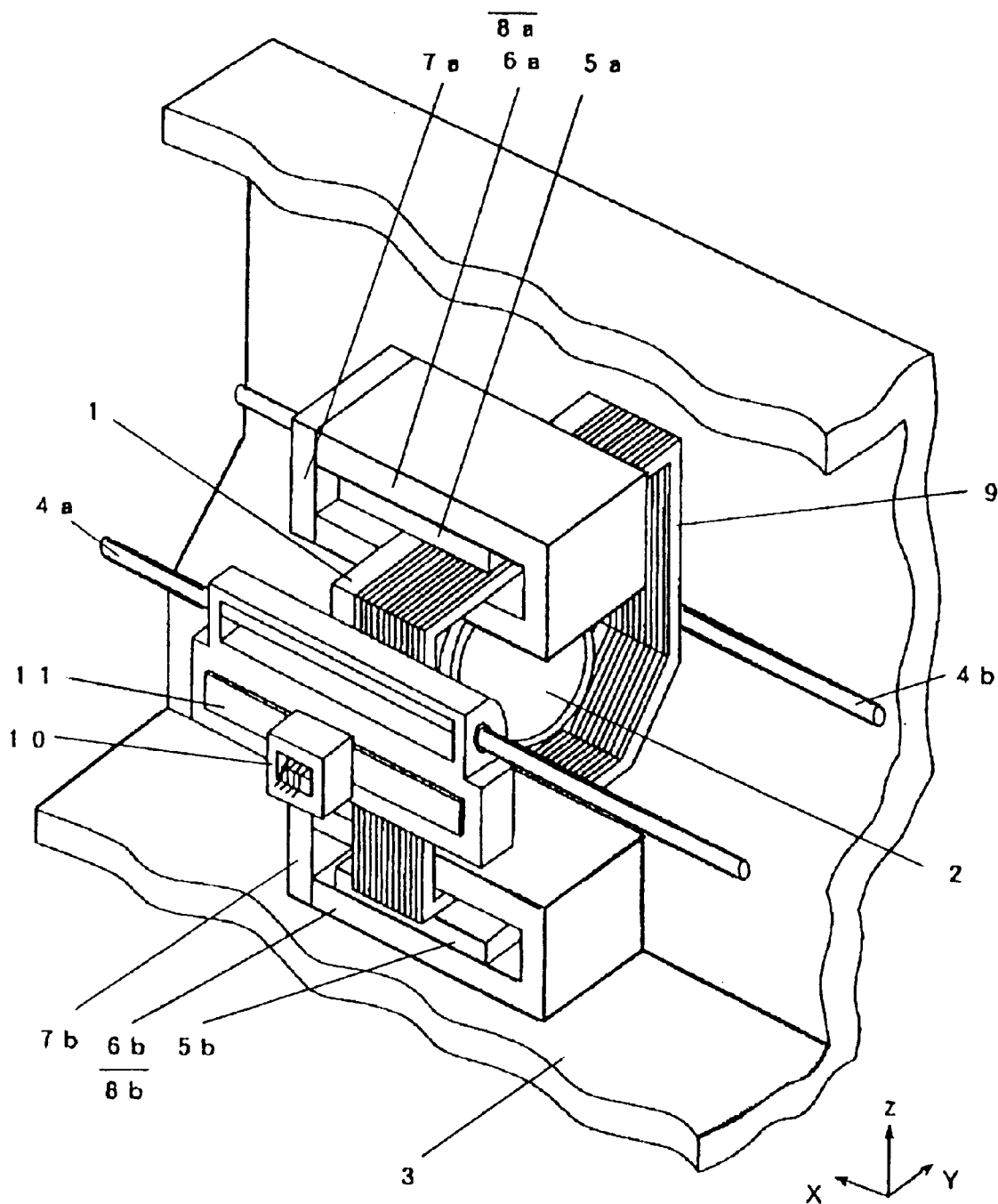
FIG. 1 is a perspective view of an inside of lens driving equipment in which the linear actuator according to the first embodiment of the present invention is employed.
Figure 2:
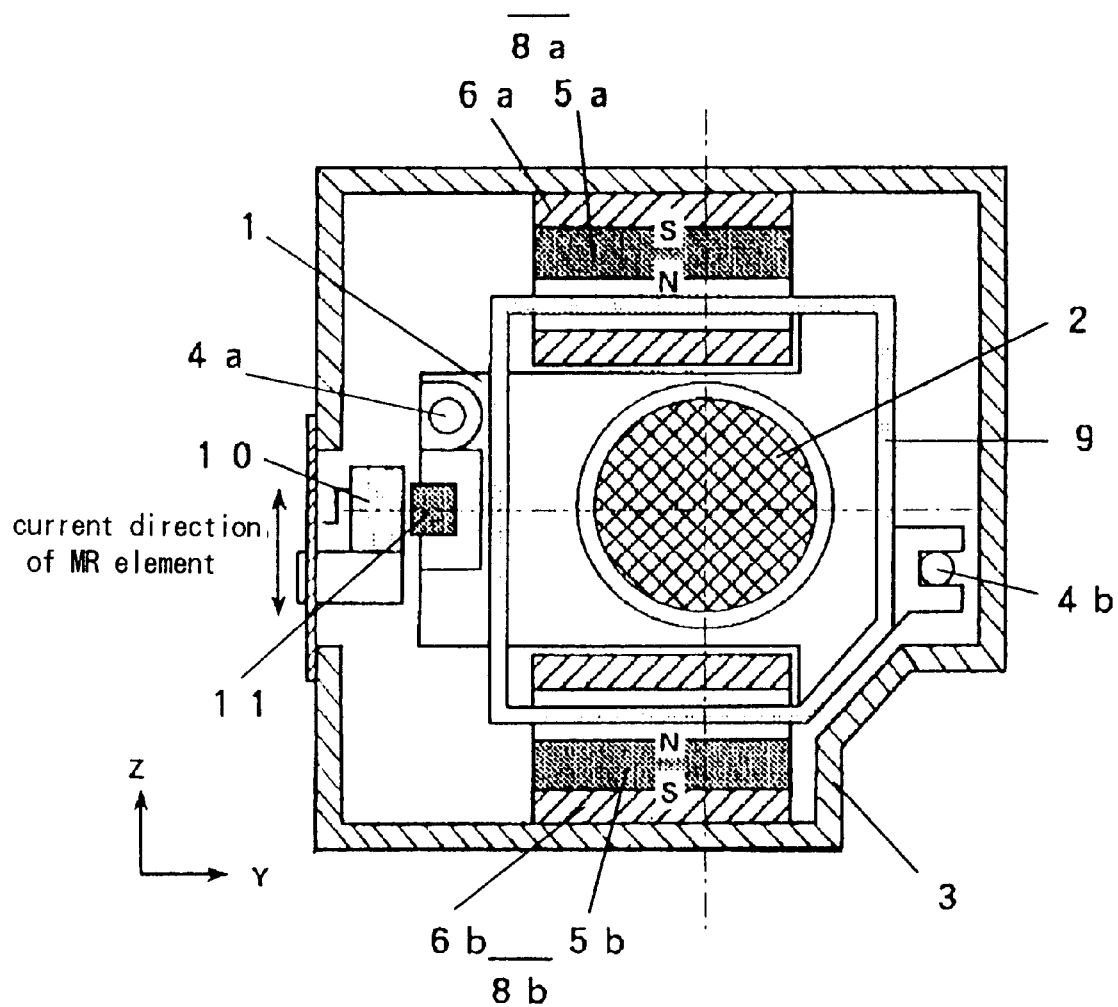
FIG. 2 and FIG. 3 are vertical and horizontal cross sections of the lens driving equipment shown in FIG. 1.
Figure 3:
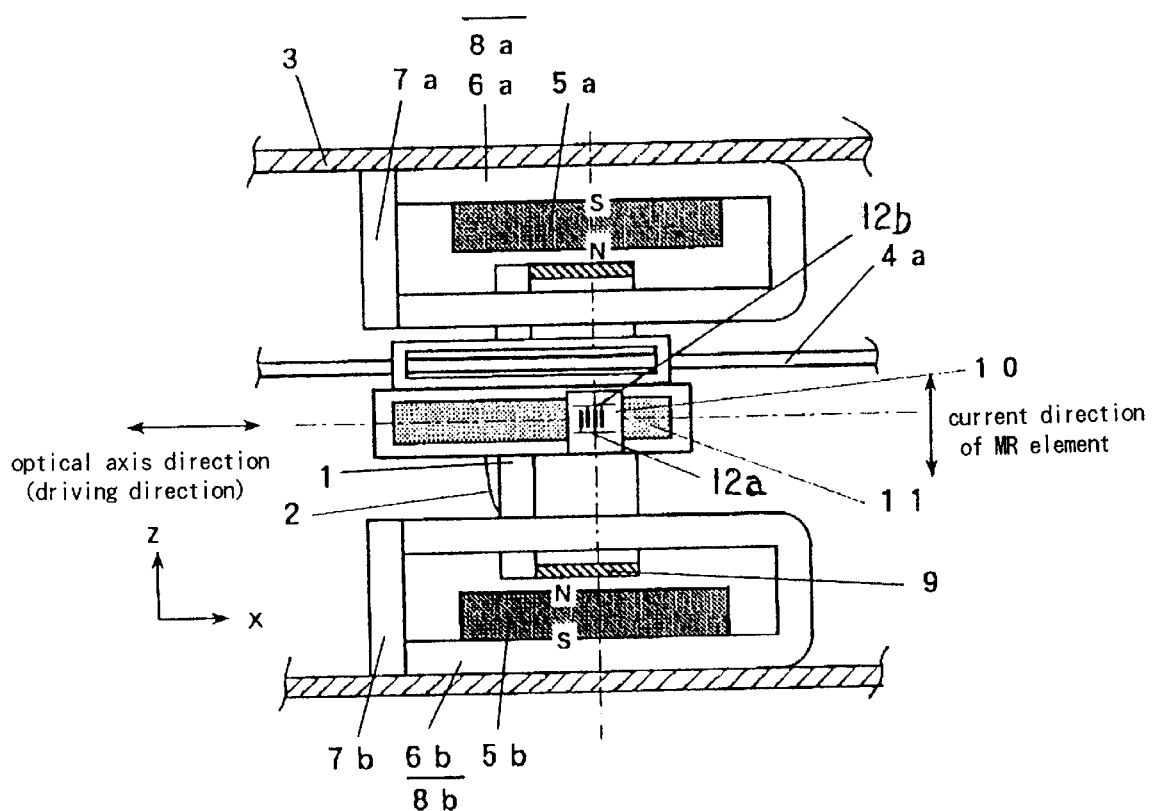

A linear actuator of Embodiment 1 is explained by refering to the attached drawings. In FIG. 1 through FIG. 3, a lens holder 1 holding a lens 2 slides along guide shafts 4a and 4b, of which both terminals are mounted to a lens barrel 3, and the guide shafts 4a and 4b are disposed parallel with an optical axis, toward the optical axis (X direction.)

Magnetic circuits 8a and 8b are mounted to the lens barrel 3 as stators of the linear actuator. The stators drive the lens holder 1 along the optical axis. The magnetic circuit 8a comprises a magnet 5a vertically polarized with regard to the driving direction X direction), a main yoke 6a shaped in "U" letter, and a board-like side yoke 7a, and the magnetic circuit is shaped in symmetric with regard to the driving direction (X direction.) The magnetic circuit 8b comprises a magnet 5b, a main yoke 6b, and a side yoke 7b, and is disposed opposite to the magnetic circuit 8a. On the other hand, as a movable element a coil 9 is mounted to the lens holder 1 so that a predetermined clearance between the coil 9 and the magnets 5a and 5b may be kept. The lens holder 1 travels along the optical axis by this mechanism: electric current runs through the coil 9 to produce a magnetic flux, which flows at a right angle to a flux produced by the magnets 5a and 5b.

In order to control a position of the lens holder 1, a magnetic sensor 10 is mounted to the lens barrel 3, and a magnetic scale 11 is mounted to the lens holder 1, and both function as a position detector. The magnetic sensor 10 is disposed at a symmetric center between each driving direction (X direction) of the magnetic circuits 8a and 8b, and also at a symmetric center between this pair of magnetic circuits 8a and 8b per se. The magnetic scale 11 is disposed opposite to a detecting face of the magnetic sensor 10 with a predetermined distance. The magnetic scale comprises a ferromagnetic material such as ferrite polarized with interleaved S polarity and N polarity at a predetermined pitch along the driving direction. This polarization is done by moving the ferromagnetic material at a predetermined speed with regard to a magnetic head which functions as a polarizing jig.

The magnetic sensor 10 employs a two-phase magnetoresistive sensor comprising MR elements 12a and 12b made of ferromagnetic thin film such as NiFe or NiCo, etc having the characteristic that the resistance value changes depending on a magnetic field. These MR elements 12a and 12b are disposed along the driving direction with a ¼ pitch of the polarizing pitch between S and N polarities on the magnetic scale 11. The magnetic sensor 10 and the magnetic scale 11 are disposed so that currents through the MR elements 12a and 12b run along polarizing directions of the magnets 5a and 5b.

Figure 4:
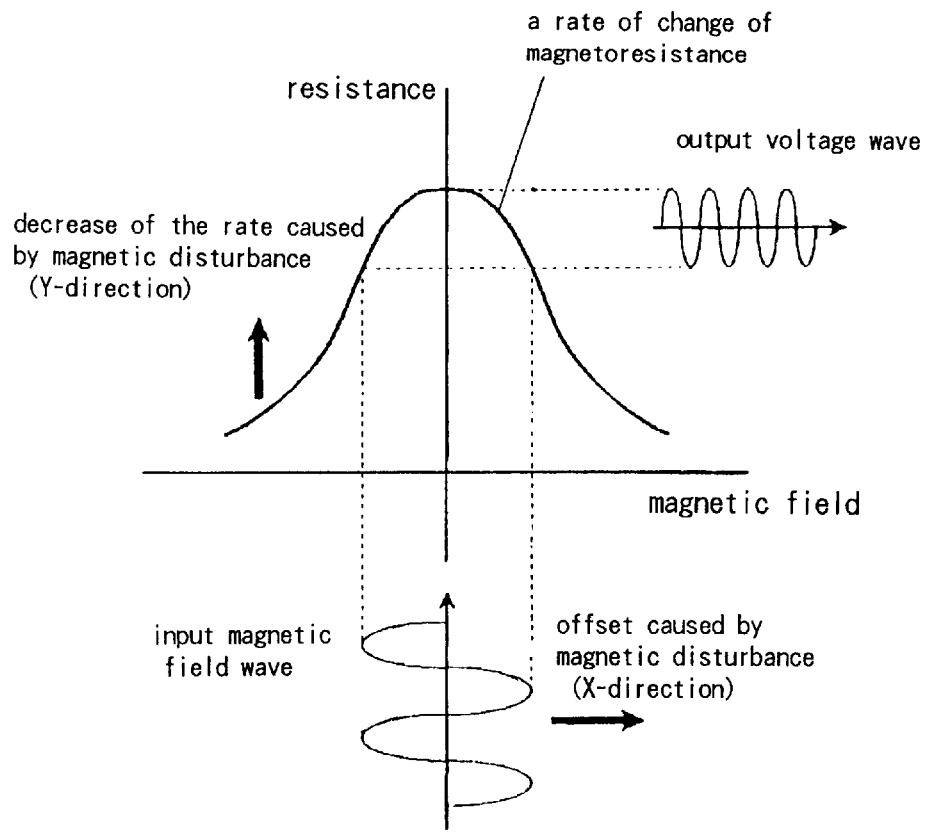
FIG. 4 shows a rate of change of the magnetic resistance of an MR element employed in the lens driving equipment shown in FIG. 1.

FIG. 4 depicts a characteristic of a magnetic resistance change rate of the MR elements 12a and 12b, i.e. FIG. 4 shows that a resistance value decreases responding to a strength of magnetic filed. The resistance value changes little with regard to a magnetic filed vertical to the current directions of the MR elements 12a and 12b and also vertical to a detecting face (i.e. Y direction), while the resistance value changes great with regard to a magnetic field vertical to the current directions of the MR elements 12a and 12b and parallel to the detecting face (i.e. X direction.) The resistance value changes a little with regard to a magnetic field parallel to the current directions of the MR elements 12a and 12b (i.e. Z direction.)

Figure 5:
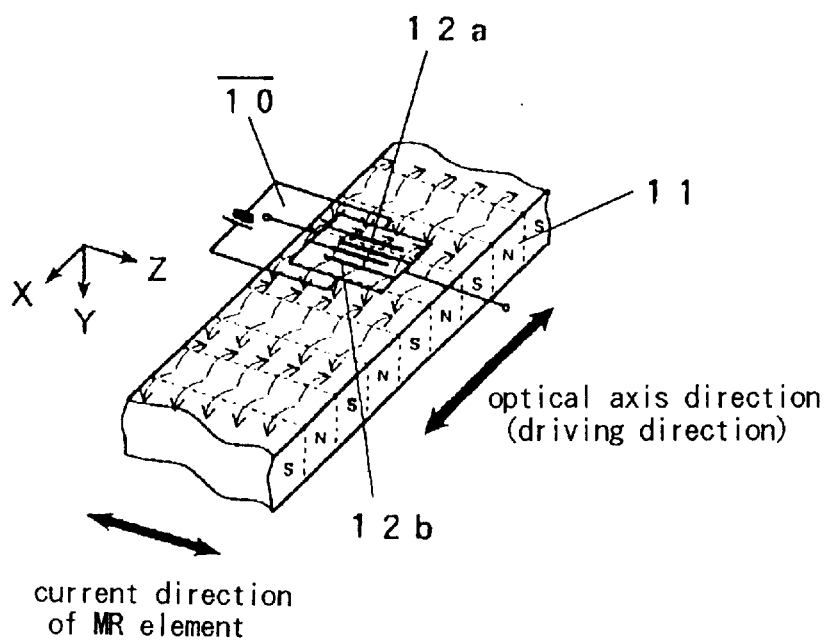
FIG. 5 is a perspective view depicting a position detector employed in the lens driving equipment shown in FIG. 1.

Based on this characteristic, the magnetic scale 11 having the polarizing pattern shown in FIG. 5 changes its position with regard to the magnetic sensor 10, thereby changing resistance values of the MR elements 12a and 12b corresponding to a changing pattern of a magnetic field strength, this changing pattern forms a sign wave which is produced along X direction. Another changing pattern of a magnetic field strength is produced forming a sign wave along Y direction, which has a 180° phase difference from X direction. However, according to the above characteristic, the resistance values of the MR elements change little. Voltages are applied to the MR elements 12a and 12b to tap off output signals forming two sign waves of which phases differ 90° with each other. Modulation-interpolation-process is conducted on these two signal waves in a signal process circuit (not shown), thereby detecting a position as well as a driving direction of the lens holder 1. Based on this detection data, a positioning of the lens 2 is accurately controlled by a control circuit (not shown)

Next, how much the leakage fluxes from the magnetic circuits 8a and 8b, which are used for driving, influence the magnetic sensor 10, is explained. The MR elements 12a and 12b have the above mentioned characteristic that the magnetic resistance changes along X and Z directions. Sensitivity of magnetic resistance change is high particularly along X direction, and thus the signal wave is offset by overlaying magnetic disturbance on a signal of a magnetic strength changing pattern shaped in a sign wave produced from the magnetic scale. This phenomenon distorts the wave form of an output signal from the MR elements, etc., thereby increasing errors in detecting positions. In addition, the sensitivity of magnetic resistance change is rather low along Z direction, and yet, the change rate of the magnetic resistance lowers due to the magnet disturbance along Z direction, whereby the sensitivities of the MR elements are decreased.

Figure 7:
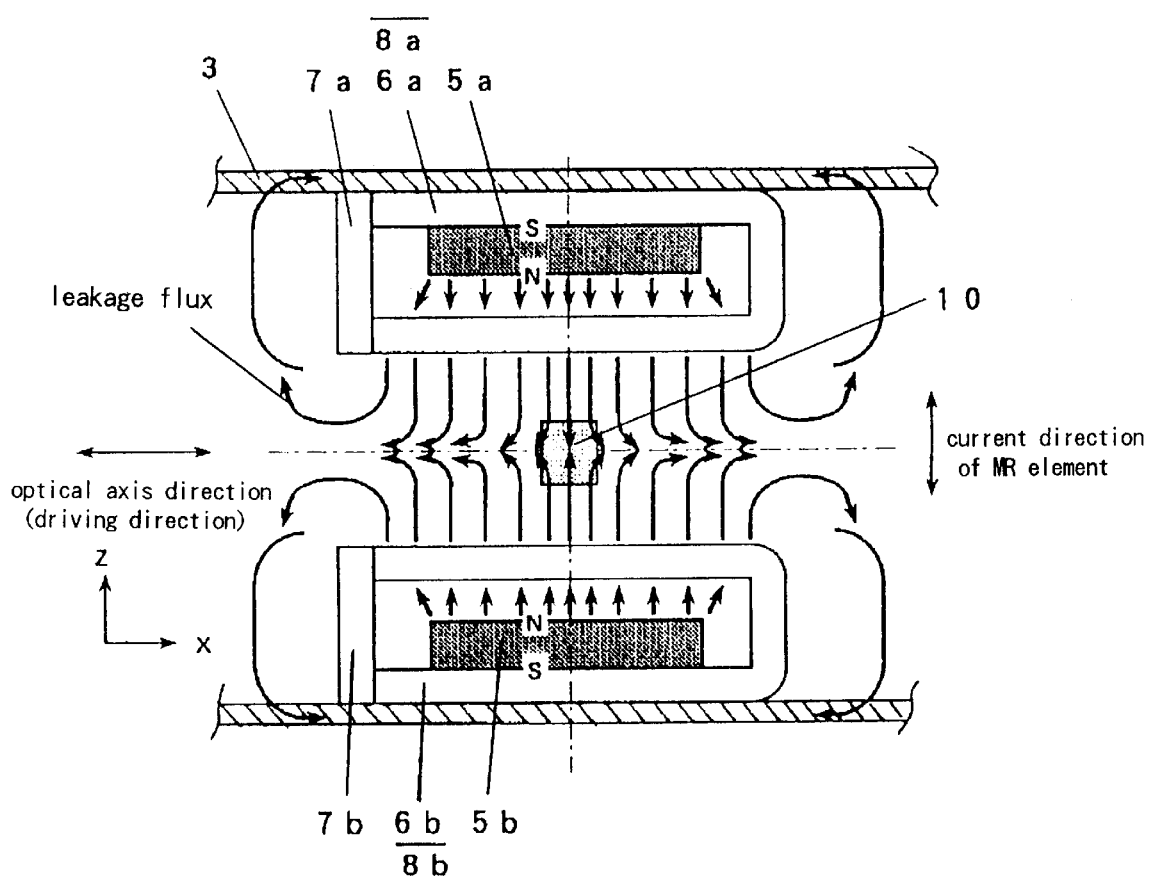

The magnetic disturbances along X and Z directions produce such problems as above to the MR elements 12a and 12b. However, in the case of Embodiment 1, since a pair of the magnetic circuits 8a and 8b are approximately disposed symmetrically with regard to the driving direction (X direction), the leakage flux along X direction from the magnetic sensor 10, which is disposed at the symmetric center, becomes a very little quantity as shown in FIG. 7.

In an ideal condition where the magnetic circuits 8a and 8b are disposed symmetrically with regard to the driving direction (X direction) and the magnetic sensor 10 is disposed at the symmetric center, the leakage flux along X direction becomes zero, and yet, when the magnetic circuits 8a and 8b are approximately disposed symmetrically with regard to the driving direction (X direction), or the magnetic sensor 10 is disposed approximately at the symmetric center, the leakage flux along X direction becomes a very little quantity which does not eliminate the effect of the invention.

Embodiment 1 employs two magnetic circuits. However, the linear actuator described in Embodiment 3 and depicted in FIG. 10 through FIG. 12 explained later, one magnetic circuit 28 comprising a magnet 25, a main yoke 26 and a side yoke 27 functions as well. In this case, the magnetic sensor 10 is mounted to a lens barrel 23 so that the magnetic sensor 10 is placed at the symmetric center of the magnetic circuit 28 with regard to the driving direction (X direction), and the magnetic sensor 10 is placed opposite to the magnetic scale 11 disposed on the movable element side with a predetermined distance. The leakage flux along X direction of the magnetic sensor 10 thus becomes so little quantity that the same effect as describe in conjunction with Embodiment 1 can be obtained.

Figure 6:
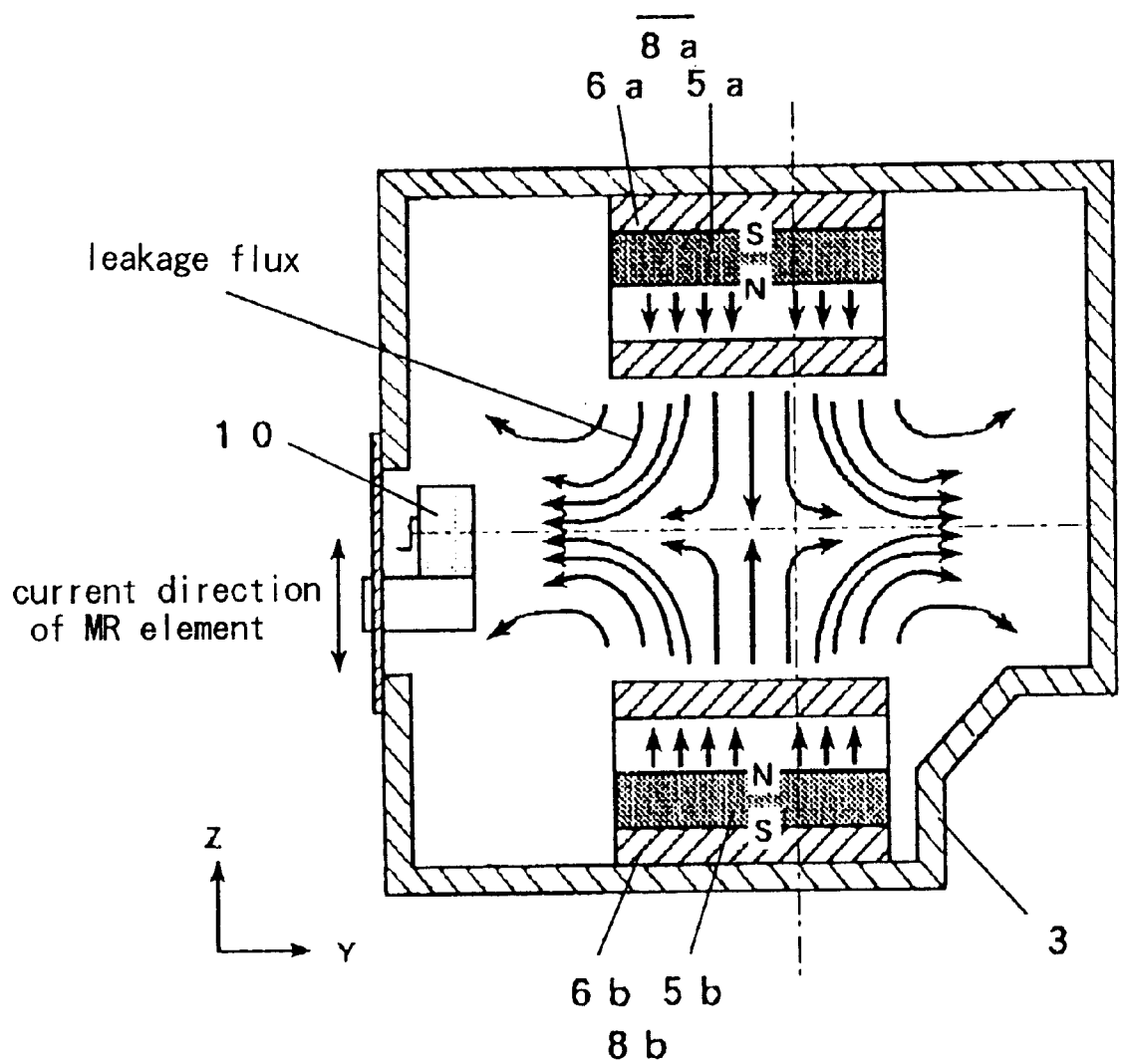
FIG. 6 and FIG. 7 depict flows of magnetic fluxes in horizontal and vertical cross sections of the linear actuator shown in FIG. 1.

Further in Embodiment 1, since a pair of the magnetic circuit 8a and 8b are disposed symmetrically so that the polarization directions of the magnets 5a and 5b are opposite with each other, i.e. a pair of the magnetic circuits 8a and 8b are disposed symmetrically with regard to Z axis, the leakage fluxes along Z direction of the magnetic sensor 10 disposed at the symmetric center cancel with each other, and the leakage flux along Z direction becomes zero as shown in FIG. 6. When the pair of magnetic circuits 8a and 8b are approximately disposed symmetrically with regard to Z axis, or the magnetic sensor 10 is disposed approximately at the symmetric center thereof the leakage flux along Z axis remains so little that this structure does not eliminate the effect. In Embodiment 1, the magnetic sensor 10 is disposed so that the currents through the MR elements 12a and 12b run parallel with the polarization directions (Z direction) of the magnets 5a and 5b, thereby preventing the sensitivities of the MR elements 12a and 12b from being lowered. In this case, when the currents through the MR elements 12a and 12b run approximately parallel with the polarization directions (Z direction) of the magnets 5a and 5b, the effect is not eliminated.

In Embodiment 1, the magnetic sensor 10 is mounted to the lens barrel 3 on the stator side and the magnetic scale is mounted to the lens holder 1 on the movable element side; on the contrary, the magnetic scale 11 can be mounted to the lens barrel 3 on the stator side and the magnetic sensor 10 can be mounted to the lens holder 1 on the movable element side with the same effect as above, i.e. decreasing the leakage flux along Z direction.

Embodiment 3

Figure 10:
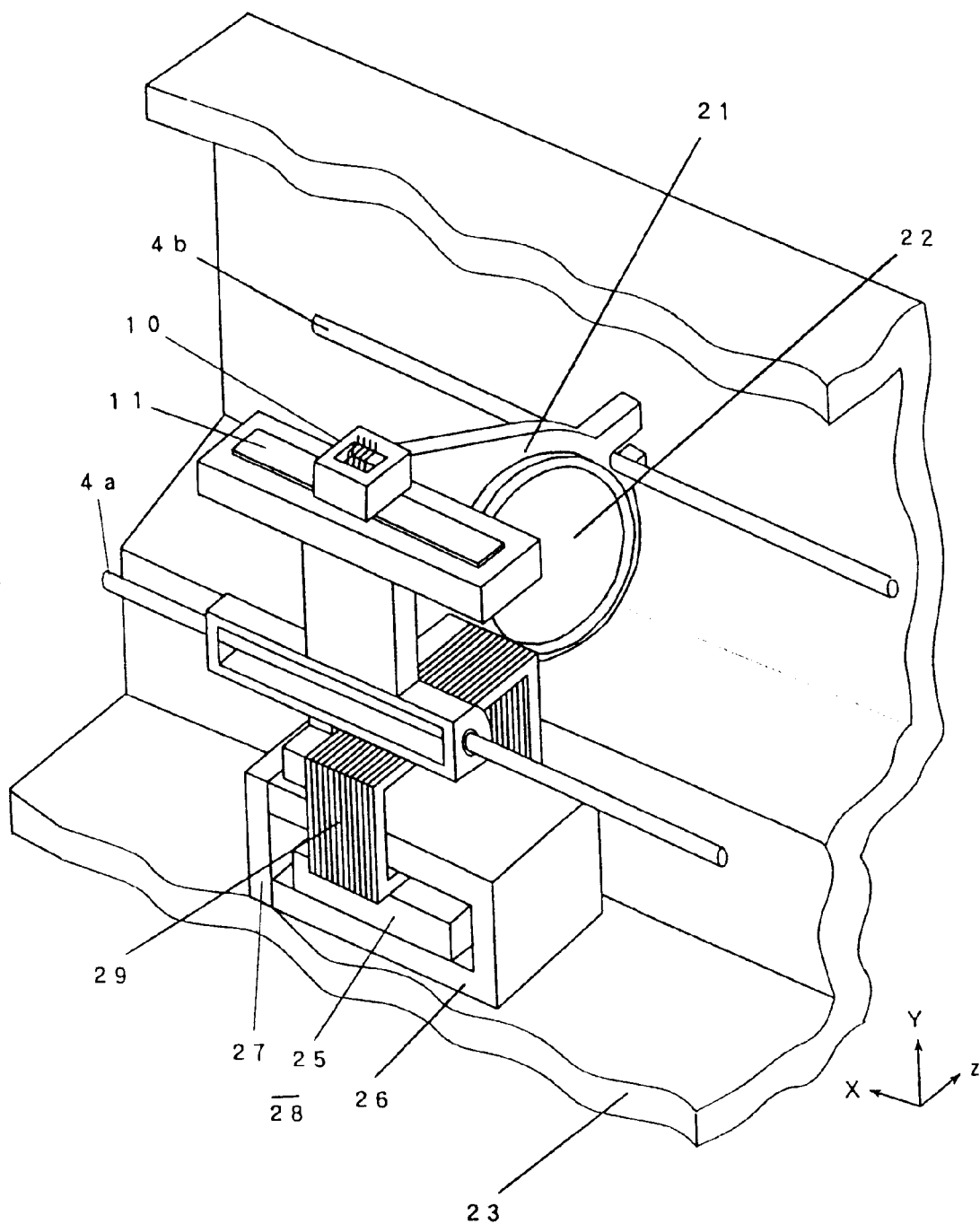
FIG. 10 is a perspective view depicting an inside of lens driving equipment employing a linear actuator.
Figure 11:
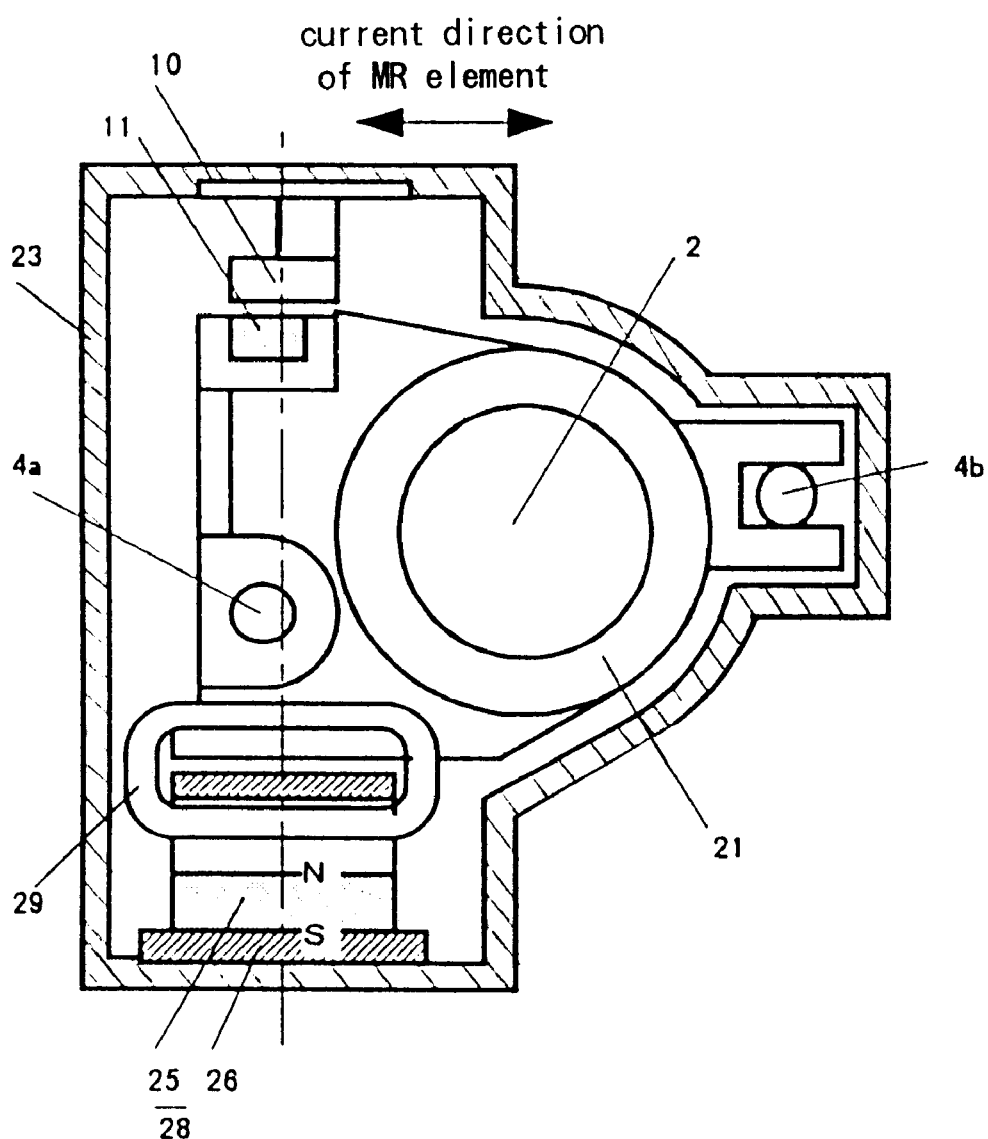
FIG. 11 and FIG. 12 are horizontal and vertical cross sections of the lens driving equipment shown in FIG. 10.
Figure 12:
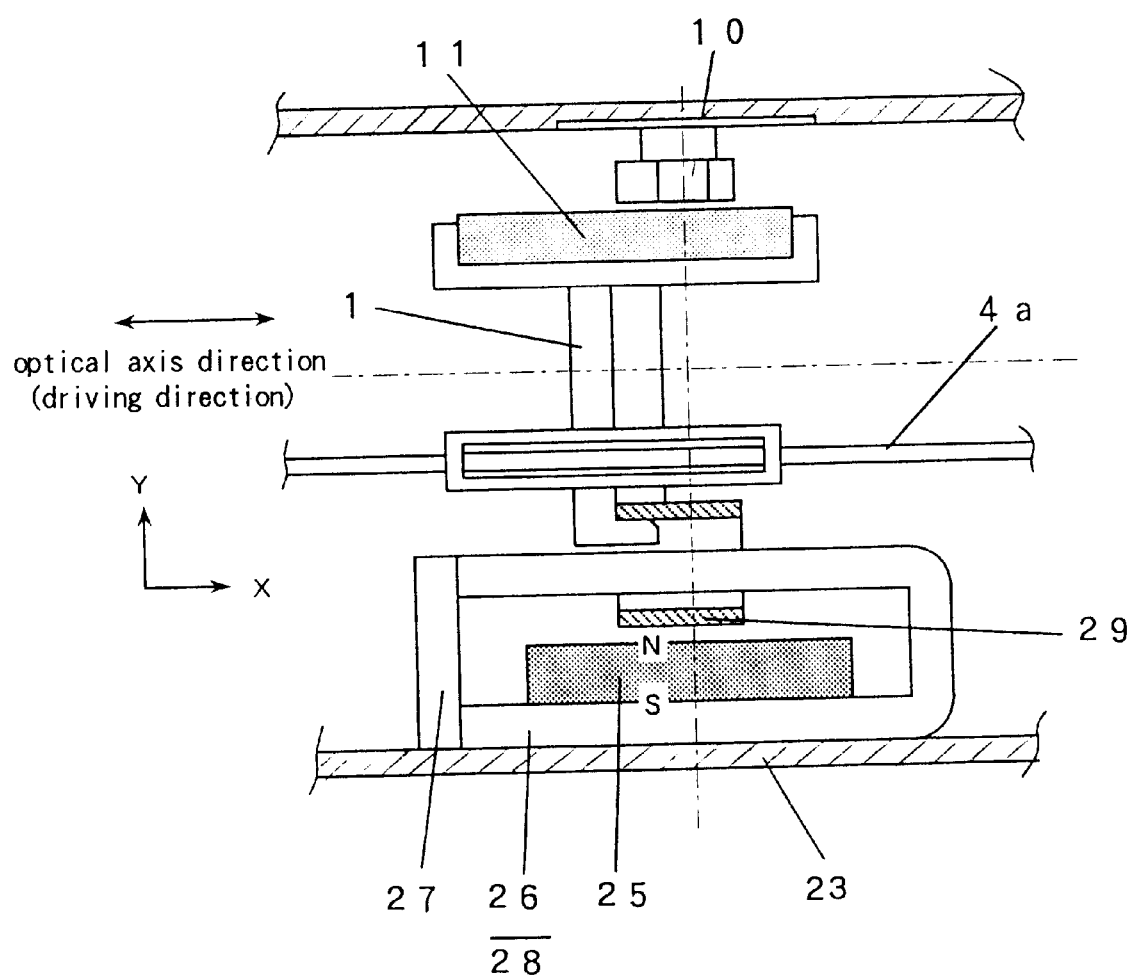
Figure 13:
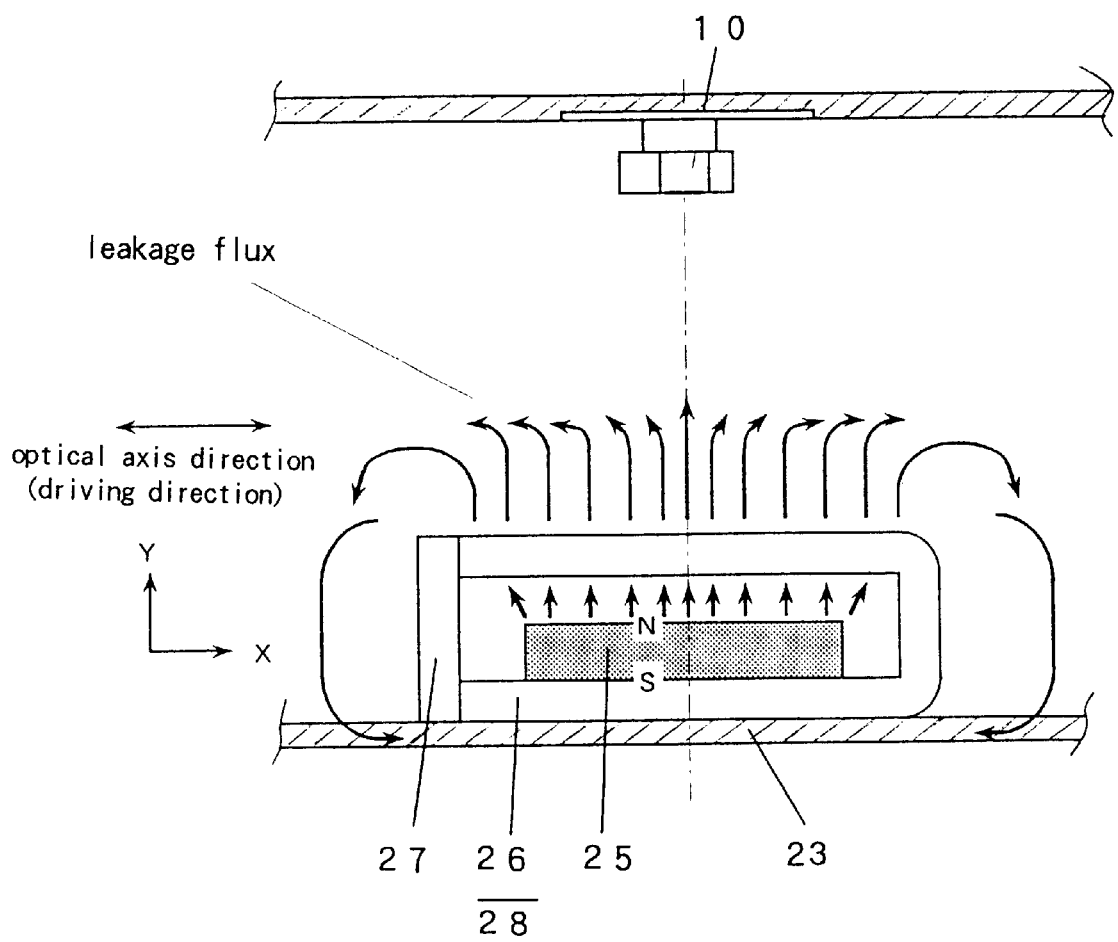
FIG. 13 and FIG. 14 depict a flow of a magnetic flux in horizontal and vertical cross sections of the linear actuator shown in FIG. 10.
Figure 14:
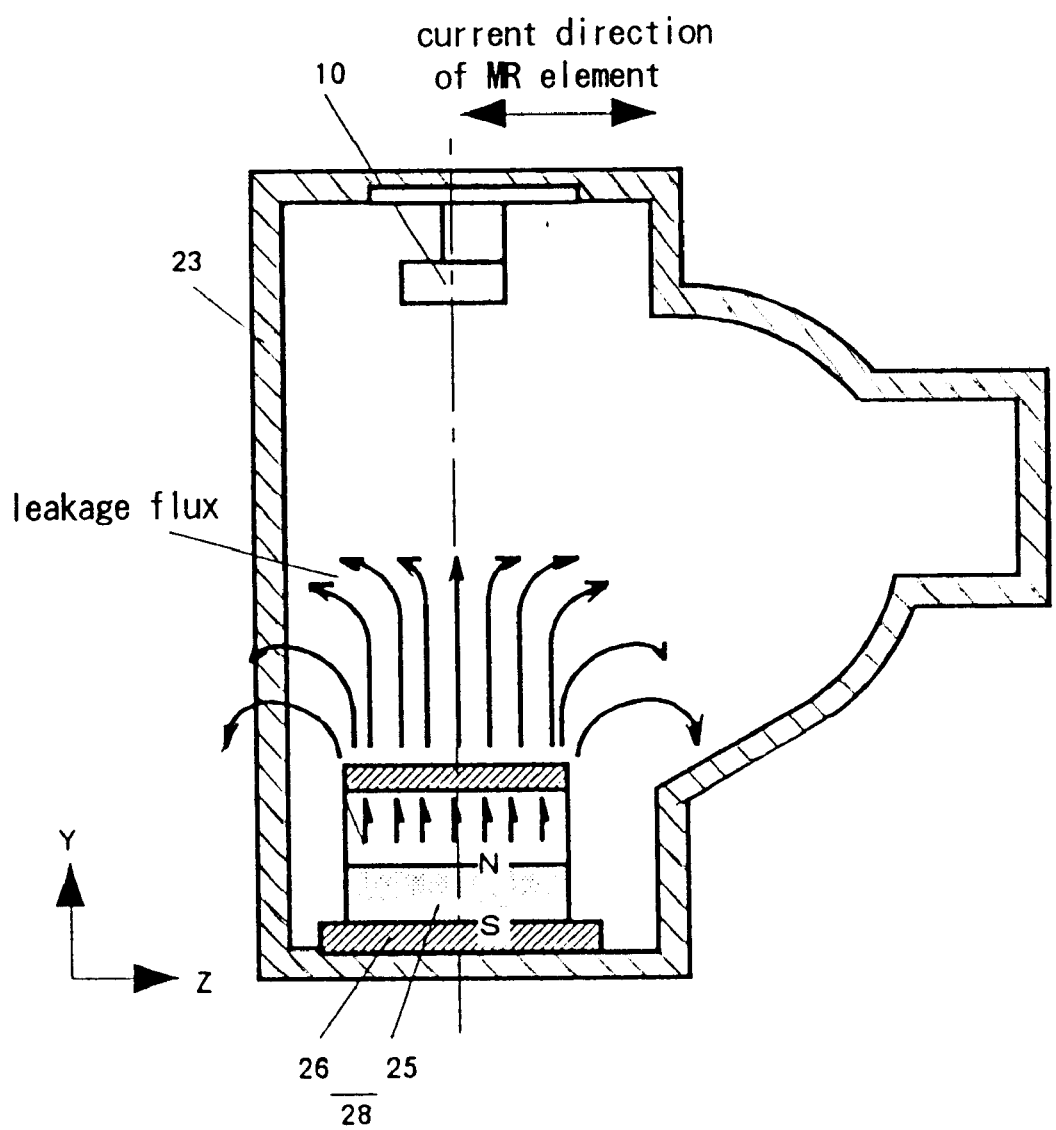

Regarding the linear actuator described in Embodiment 3 below shown in FIG. 10 through FIG. 12, one magnetic circuit 28 is mounted to a lens barrel 23 on the stator side, where members of the magnetic circuit 28, i.e. a magnet 25, a main yoke 26 and a side yoke 27, are disposed symmetrically viewed from a driving direction. A coil 29 is mounted to a lens holder 21 on the movable element side. The magnetic sensor 10 is disposed at a symmetric center of the magnetic circuit 28 viewed from the driving direction and is disposed to be opposite to the magnetic scale 11 with a predetermined distance therebetween. This structure reduces leakage flux to the magnetic sensor 10 along Z direction to zero as shown in FIG. 14, and the same effect as in the previous embodiment can be gained. In this case, when the magnetic circuit 28 is shaped in approximately symmetric form, or the magnetic sensor 10 is placed approximately at the symmetric center, the leakage flux remains so little that the effect should not be eliminated.

In Embodiment 3, since the magnetic sensor 10 is disposed so that the current through the MR elements 12a and 12b run vertically with regard to the polarization direction (Y direction) of the magnet 5, the sensitivities of the MR elements 12a and 12b are prevented from being lowered. This current direction can be approximately vertical with regard to the polarization direction (Y direction) without eliminating the effect.

In Embodiment 3, the magnetic sensor 10 is mounted to the lens barrel 23 on the stator side and the magnetic scale is mounted to the lens holder 21 in the movable element side; on the contrary, the magnetic scale 11 can be mounted to the lens barrel 23 on the stator side and the magnetic sensor 10 can be mounted to the lens holder 21 on the movable element side with the same effect as above, i.e. decreasing the leakage flux along Z direction.

Embodiment 2

Figure 8:
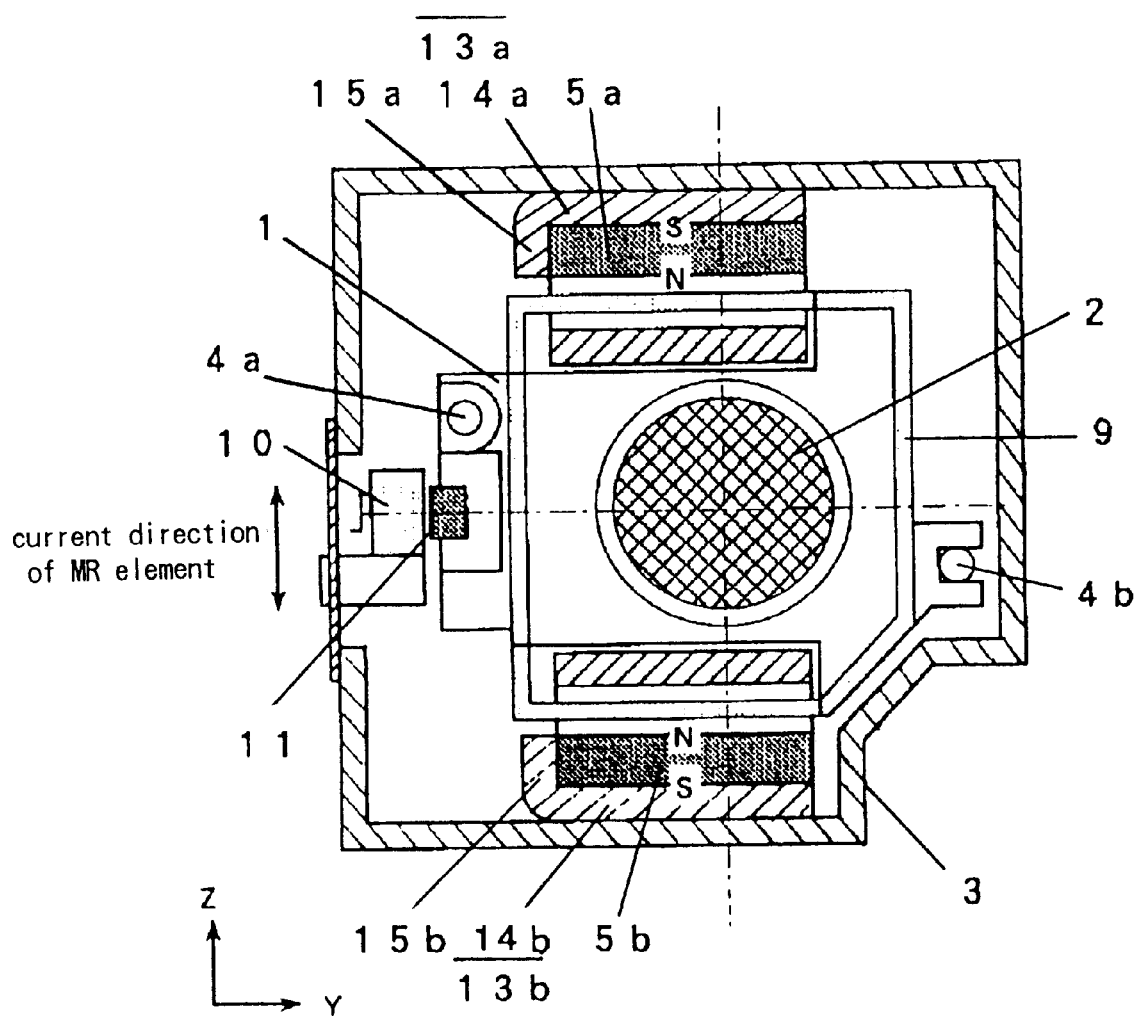
FIG. 8 is a horizontal cross section depicting lens driving equipment employing the linear actuator according to the second embodiment of the present invention.
Figure 9:
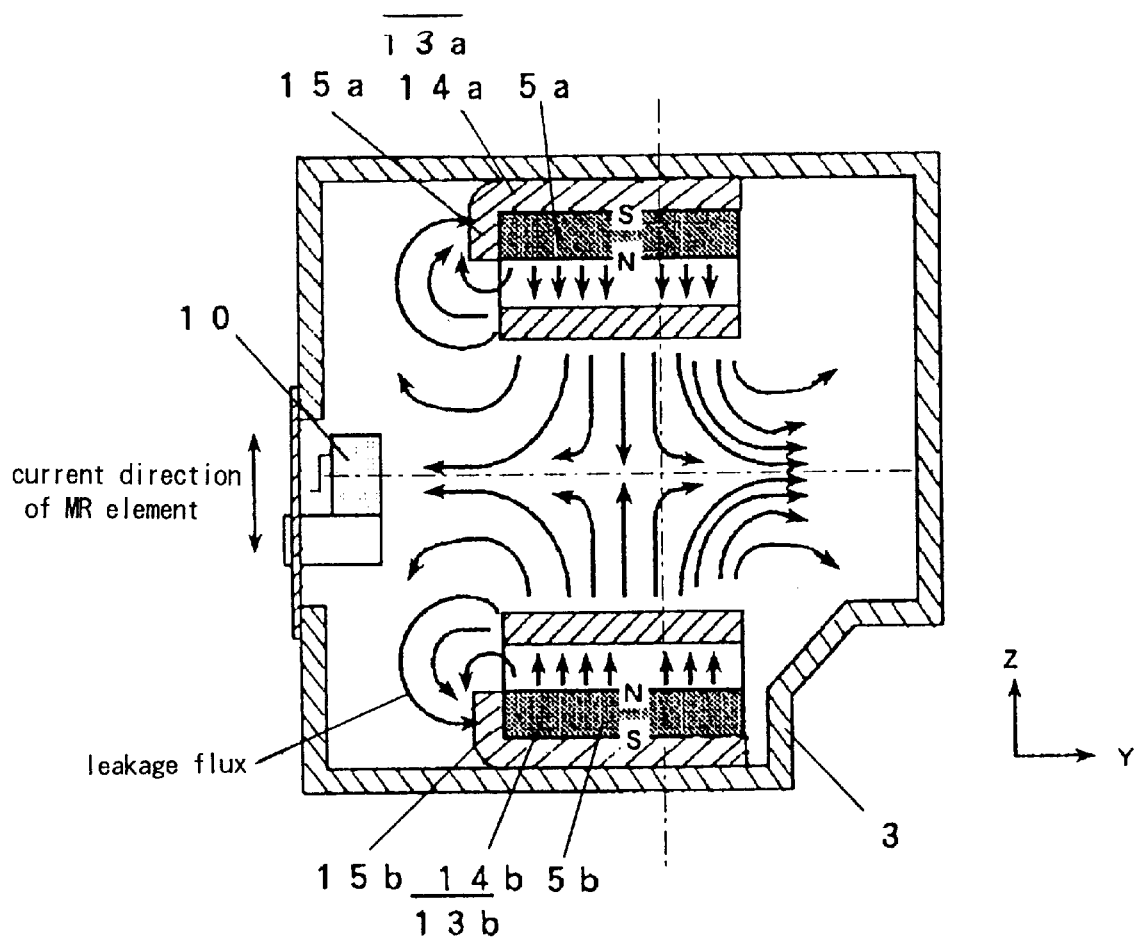
FIG. 9 depicts a flow of a magnetic flux in horizontal cross section of the linear actuator shown in FIG. 8.

Embodiment 2 is explained by referring to FIG. 8 and FIG. 9. Embodiment 2 is a modification of Embodiment 1. As shown in FIG. 8, Embodiment 2 employs magnetic circuits 13a and 13b, where portions of main yokes 14a and 14b on the magnetic side 10 are bent to form magnetic bodies 15a and 15b on the sides of magnets 5a and 5b facing the magnetic sensor 10.

In this structure, as shown in FIG. 9, leakage fluxes from the magnet 5a and 5b as well as from the main yoke 14a and 14b produce magnetic fluxes flowing toward the magnetic bodies 15a and 15b, thus the leakage fluxes along Y and Z directions at the magnetic sensor 10 decreases. Therefore, the magnetic circuits 13a and 13b are slightly deviated from the symmetric position, or the magnetic sensor 10 is slightly deviated from the symmetric position of the pair of the magnetic circuits 13a and 13b, magnetic disturbance less influence the magnetic sensor 10. In Embodiment 2, the magnetic bodies 15a and 15b are made from portions of the main yokes 14a and 14b, however; the magnetic bodies can be made from other members.

The present invention is not limited to Embodiments 1, 2 and 3, and yet, various modifications are available. In these embodiments, the magnetic sensor employing the MR element is used, however; any magnetic sensor can be employed in the present invention as far as the sensor can tap off an output signal corresponding to a strength of magnetic force, where any magnetic sensor should be mounted so that its direction vulnerable to magnetic disturbance is laid parallel with X direction or Z direction. The present invention is not limited to the linear actuator which drives a group of traveling lenses of optical equipment including camera, etc. but can be applied to the linear actuators employed in a record/playback device such as a hard disc device and an optical magnetic disc device, printing device such as a plotter and a printer, and an industrial device such as a robot with expecting the same effect.

What is claimed is:

1. A linear actuator comprising;
   (a) a stator having at least one magnetic circuit substantially symmetrical with regard to a driving direction, said magnetic circuit comprising a magnet polarized vertically with regard to a driving direction so as to have a single magnetic pole on a surface of said magnet parallel to the driving direction and a yoke,
   (b) a movable element comprising a single coil having a predetermined clearance from said magnet, which single coil traveling along said driving direction by running electric current therethrough at a right angle to a magnetic flux produced by said magnet, and
   (c) a position detection means comprising:
      (c-1) a magnetic scale disposed on said movable element, and
      (c-2) a magnetic sensor disposed on said stator at substantial symmetric center of said magnetic circuit viewed from a right angle to the driving direction, said magnetic sensor being disposed opposite to said magnetic scale.

2. The linear actuator of claim 1,
   wherein said stator comprises;
      (a) a first magnetic circuit having a first magnet, and
      (b) a second magnetic circuit having a second magnet, the first magnetic circuit and the second magnetic circuit being disposed so that a polarization direction of the first magnet is opposite to a polarization diection of the second magnet, and
   wherein said position detection means is disposed so that the magnetic scale and the magnetic sensor are disposed at the substantial center of said first and second magnetic circuits.

3. The linear actuator of claim 2, wherein said magnetic sensor comprises an MR element, which is disposed so that the electric current through the MR element runs approximately parallel with the polarization directions of said first and second magnets.

4. The linear actuator of claim 2 or claim 3, wherein a magnetic body is provided on a side of said first and second magnets, which side being parallel with the polarization directions of said first and second magnets.

5. The linear actuator of claim 4, wherein each of said magnetic body is incorporated into each yoke of said first and second magnetic circuits.

6. A linear actuator, comprising:
   (a) a stator having one magnetic circuit substantially symmetrical viewed from the driving direction, said magnetic circuit comprising a magnet polarized vertically with regard to a driving direction and a yoke,
   (b) a movable element comprising a single coil having a predetermined clearance from said magnet, which single coil traveling along said driving direction by running electric current therethrough at a right angle to a magnetic flux produced by said magnet, and
   (c) a position detection means comprising:
      (c-1) a magnetic scale disposed on one of said movable element and said stator, and
      (c-2) a magnetic sensor disposed on one of said movable element and said stator whichever remains at the substantial symmetric center of said magnetic circuit viewed from the driving direction.

7. The linear actuator of claim 6, wherein said magnetic sensor comprises an MR element which is disposed so that electric current therethrough approximately runs vertically with regard to the polarization direction of said magnet.

8. In optical equipment which forms an image of an object on an image formation surface through an optical system including a group of traveling lenses, the optical equipment having at least one linear actuator as driving means for driving said group of traveling lenses, which linear actuator being described in claim 1 through claim 7.

* * * * *